United States Patent
Bhatt et al.

(10) Patent No.: US 11,580,230 B2
(45) Date of Patent: Feb. 14, 2023

(54) SYSTEM AND METHOD FOR ASSESSING SOFTWARE CONTAINERS FOR VULNERABILITIES

(71) Applicants: Bhuvan Bhatt, Hyderabad (IN); Vijay Kumar Kamannavar, Hyderabad (IN)

(72) Inventors: Bhuvan Bhatt, Hyderabad (IN); Vijay Kumar Kamannavar, Hyderabad (IN)

(73) Assignee: Aqua Security Software, Ltd., Ramat Gan (IL)

( * ) Notice: Subject to any disclaimer, the term of this patent is extended or adjusted under 35 U.S.C. 154(b) by 67 days.

(21) Appl. No.: 17/106,310

(22) Filed: Nov. 30, 2020

(65) Prior Publication Data

US 2022/0171856 A1 Jun. 2, 2022

(51) Int. Cl.
*G06F 21/00* (2013.01)
*G06F 21/57* (2013.01)
*G06F 21/52* (2013.01)

(52) U.S. Cl.
CPC ............ *G06F 21/577* (2013.01); *G06F 21/52* (2013.01); *G06F 2221/033* (2013.01)

(58) Field of Classification Search
CPC ... G06F 21/577; G06F 21/52; G06F 2221/033
See application file for complete search history.

(56) References Cited

U.S. PATENT DOCUMENTS

| | | | |
|---|---|---|---|
| 2017/0353496 A1* | 12/2017 | Pai ...................... | H04L 63/1441 |
| 2019/0005246 A1* | 1/2019 | Cherny .................. | G06F 21/57 |
| 2020/0162498 A1* | 5/2020 | Ababtain ............. | H04L 63/1416 |
| 2020/0210149 A1* | 7/2020 | Caldwell ............. | G06F 11/3604 |

* cited by examiner

*Primary Examiner* — Ghazal B Shehni
(74) *Attorney, Agent, or Firm* — Carlson, Gaskey & Olds, P.C.

(57) ABSTRACT

An example method includes determining, based on a static scan, that a software container image or an intended execution environment of the software container image meets one or more first criteria required to exploit a software vulnerability. Based on the determining, runtime behavior of a software container instantiated from the software container image is monitored. The monitoring including determining whether the software container meets one or more second criteria required to exploit the software vulnerability, wherein the one or more first second criteria differs from the one or more second criteria. Based on the runtime monitoring, a risk score that indicates a magnitude of a risk the software vulnerability poses for the software container is determined, and a notification of the risk score is provided. A system for assessing software containers for vulnerabilities is also disclosed.

18 Claims, 3 Drawing Sheets

SYSTEM AND METHOD FOR ASSESSING SOFTWARE CONTAINERS FOR VULNERABILITIES

BACKGROUND

This application relates to software containers, and more particularly a system and method for assessing software containers for vulnerabilities.

Virtual machines (VMs) have gained popularity for a variety of computing needs. A virtual machine is a software implementation of a machine that executes programs like a physical machine. A typical virtual machine includes an entire operating system that runs on top of a host operating system, and one or more applications that run within that operating system. Use of VMs enables an administrator to run several operating system instances at the same time on a single server. A specialized application called a hypervisor manages the virtual machines that run on a given server. Running multiple operating system instances on a single machine, however, is resource-intensive.

More recently, software containers are being used as an alternative to running multiple virtual machines. A software container is a self-contained software unit that includes one or more software applications plus all of the dependencies required to run the application(s) bundled into one package. The dependencies may include libraries, binaries, and/or configuration files, for example. A container engine (e.g., Docker® or Kubernetes®) is configured to instantiate a software container image into a running software container. By containerizing the application and its dependencies, differences in operating system distributions and underlying infrastructure are abstracted away, making it easy to migrate an application between various environments (e.g., development, testing, and production). A container engine can run multiple containers in isolation from each other on a single host operating system, which provides an alternative to running multiple virtual machines and their accompanying operating systems on a single server. Because containers allow an administrator to virtualize one or more individual applications rather than an entire operating system, running a given quantity of containers is less resource intensive than running the same quantity of VMs.

In computer security, a vulnerability is a weakness which can be exploited by a threat actor, such as an attacker, to cross privilege boundaries to perform unauthorized actions within a computer system. In the context of software containers, vulnerabilities often relate to the use of a particular container engine, a particular underlying host operating system, or a particular software package within the software container.

SUMMARY

A method according to an example of the present disclosure includes determining, based on a static scan, that a software container image or an intended execution environment for the software container image meets one or more first criteria required to exploit a software vulnerability. Based on the determination, runtime behavior of a software container instantiated from the software container image is monitored, which includes determining whether the software container meets one or more second criteria required to exploit the software vulnerability. The one or more first second criteria differ from the one or more second criteria. Based on the runtime monitoring, a risk score that indicates a magnitude of a risk the software vulnerability poses for the software container is determined, and a notification of the risk score is provided.

In a further embodiment of any of the foregoing embodiments, determining the risk score includes determining a first risk score based on the software container meeting the one or more second criteria, and determining a second risk score based on the software container not meeting the one or more second criteria, wherein the first risk score indicates a greater magnitude of the risk than the second score.

In a further embodiment of any of the foregoing embodiments, the first risk score is a Common Vulnerability Scoring System (CVSS) score for the software vulnerability or is based on the CVSS score, and the second risk score is an adjusted version of the CVSS score.

In a further embodiment of any of the foregoing embodiments, the one or more first criteria includes a requirement that a particular software package is part of the software container image, and the one or more second criteria includes a requirement that the particular software package is executed during runtime of the software container.

In a further embodiment of any of the foregoing embodiments, the one or more first criteria includes a requirement that the software container image includes one or more particular versions of a Linux software package or that the intended execution environment for the software container image includes one or more particular versions of Linux, and the one or more second criteria includes a requirement that a particular Linux capability, Linux security facility, or Linux rights flag is enabled during runtime of the software container.

In a further embodiment of any of the foregoing embodiments, the one or more first criteria includes a requirement that the software container image is configured to access a URL associated with exploitation of the software vulnerability, and the one or more second criteria includes one of the following: a requirement that the software container does not require a username and password to be provided in response to a request to access the URL, and a requirement that Dynamic Host Configuration Protocol (DHCP) is enabled in the software container.

In a further embodiment of any of the foregoing embodiments, the one or more first criteria includes a requirement that a container engine configured to instantiate the software container is a particular version of a particular container engine which includes a first mode and a second mode, and the second mode is an enhanced logging mode in which a greater amount of logging is performed than in the first mode. The one or more second criteria includes a requirement that the that the container engine instantiates the software container in the first mode.

In a further embodiment of any of the foregoing embodiments, the one or more first criteria includes a requirement that a container engine configured to instantiate the software container is a particular version of a particular container engine, and the one or more second criteria includes a requirement that Transport Layer Security (TLS) authentication is enabled in the software container.

In a further embodiment of any of the foregoing embodiments, the software container is configured to use a cipher for TLS authentication, and determining the risk score includes: determining a first risk score based on a strength of the cipher not exceeding a cipher strength threshold, and determining a second risk score based on the strength of the cipher exceeding the cipher strength threshold, wherein the first risk score indicates a greater magnitude of the risk than the second score.

In a further embodiment of any of the foregoing embodiments, the method includes omitting the monitoring, determining, and providing steps for an additional software container that is instantiated from an additional software container image based on a static scan detecting no vulnerabilities in the additional software container image or the intended execution environment of the additional software container image.

A system for assessing software containers for vulnerabilities according to an example of the present disclosure includes memory, and processing circuitry operatively connected to memory. The processing circuitry is configured to determine, based on a static scan, that a software container image or an intended execution environment for the software container image meets one or more first criteria required to exploit a software vulnerability. The processing circuitry is configured to, based on the determination, monitor runtime behavior of a software container instantiated from the software container image, the monitoring including a determination of whether the software container meets one or more second criteria required to exploit the software vulnerability. The one or more first criteria differ from the one or more second criteria. The processing circuitry is configured to, based on the runtime monitoring, determine a risk score that indicates a magnitude of a risk the vulnerability poses for the software container, and provide a notification of the risk score.

In a further embodiment of any of the foregoing embodiments, to determine the risk score, the processing circuitry is configured to determine a first risk score based on the software container meeting the one or more second criteria, and determine a second risk score based on the software container not meeting the one or more second criteria, wherein the first risk score indicates a greater magnitude of the risk than the second score.

In a further embodiment of any of the foregoing embodiments, the first risk score is a Common Vulnerability Scoring System (CVSS) score for the software vulnerability or is based on the CVSS score, and the second risk score is an adjusted version of the CVSS score.

In a further embodiment of any of the foregoing embodiments, the one or more first criteria includes a requirement that a particular software package is part of the software container image, and the one or more second criteria includes a requirement that the particular software package is executed during runtime of the software container.

In a further embodiment of any of the foregoing embodiments, the one or more first criteria includes a requirement that the software container image includes one or more particular versions of a Linux software package or that the intended execution environment for the software container image includes one or more particular versions of Linux, and the one or more second criteria includes a requirement that a particular Linux capability, Linux security facility, or Linux rights flag is enabled during runtime of the software container.

In a further embodiment of any of the foregoing embodiments, the one or more first criteria includes a requirement that the software container image is configured to access a URL associated with exploitation of the software vulnerability, and the one or more second criteria includes one of the following: a requirement that the software container does not require a username and password to be provided in response to a request to access the URL, and a requirement that Dynamic Host Configuration Protocol (DHCP) is enabled in the software container.

In a further embodiment of any of the foregoing embodiments, the one or more first criteria includes a requirement that a container engine configured to instantiate the software container is a particular version of a particular container engine which includes a first mode and a second mode, and the second mode is an enhanced logging mode in which a greater amount of logging is performed than in the first mode, and the one or more second criteria includes a requirement that the that the container engine instantiates the software container in the first mode.

In a further embodiment of any of the foregoing embodiments, the one or more first criteria includes a requirement that a container engine configured to instantiate the software container is a particular version of a particular container engine, and the one or more second criteria includes a requirement that Transport Layer Security (TLS) authentication is enabled in the software container.

In a further embodiment of any of the foregoing embodiments, the software container is configured to use a cipher for TLS authentication, and to determine the risk score, the processing circuitry is configured to determine a first risk score based on a strength of the cipher not exceeding a cipher strength threshold, and determine a second risk score based on the strength of the cipher exceeding the cipher strength threshold, wherein the first risk score indicates a greater magnitude of the risk than the second score.

In a further embodiment of any of the foregoing embodiments, the processing circuitry is configured to omit the monitoring of runtime behavior for an additional software container that is instantiated from an additional software container image, wherein the omission is based on a static scan detecting no vulnerabilities in the additional software container image or the intended execution environment of the additional software container image.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Although many software vulnerabilities may have a predetermined third party risk score, such as a Common Vulnerability Scoring System (CVSS) score, those scores may not reflect an actual risk to a software container. For example, if a particular vulnerability requires a certain software application to be executed at runtime, and the software application is present in a container image but is never actually used during runtime of a corresponding software container, the CVSS may not provide an accurate representation of the risk posed by the vulnerability. As discussed in greater detail below, the system 10 of FIG. 1 monitors actual runtime behavior of a software container to provide risk scores for vulnerabilities that more accurately reflect a risk posed by the vulnerabilities.

Figure 1:
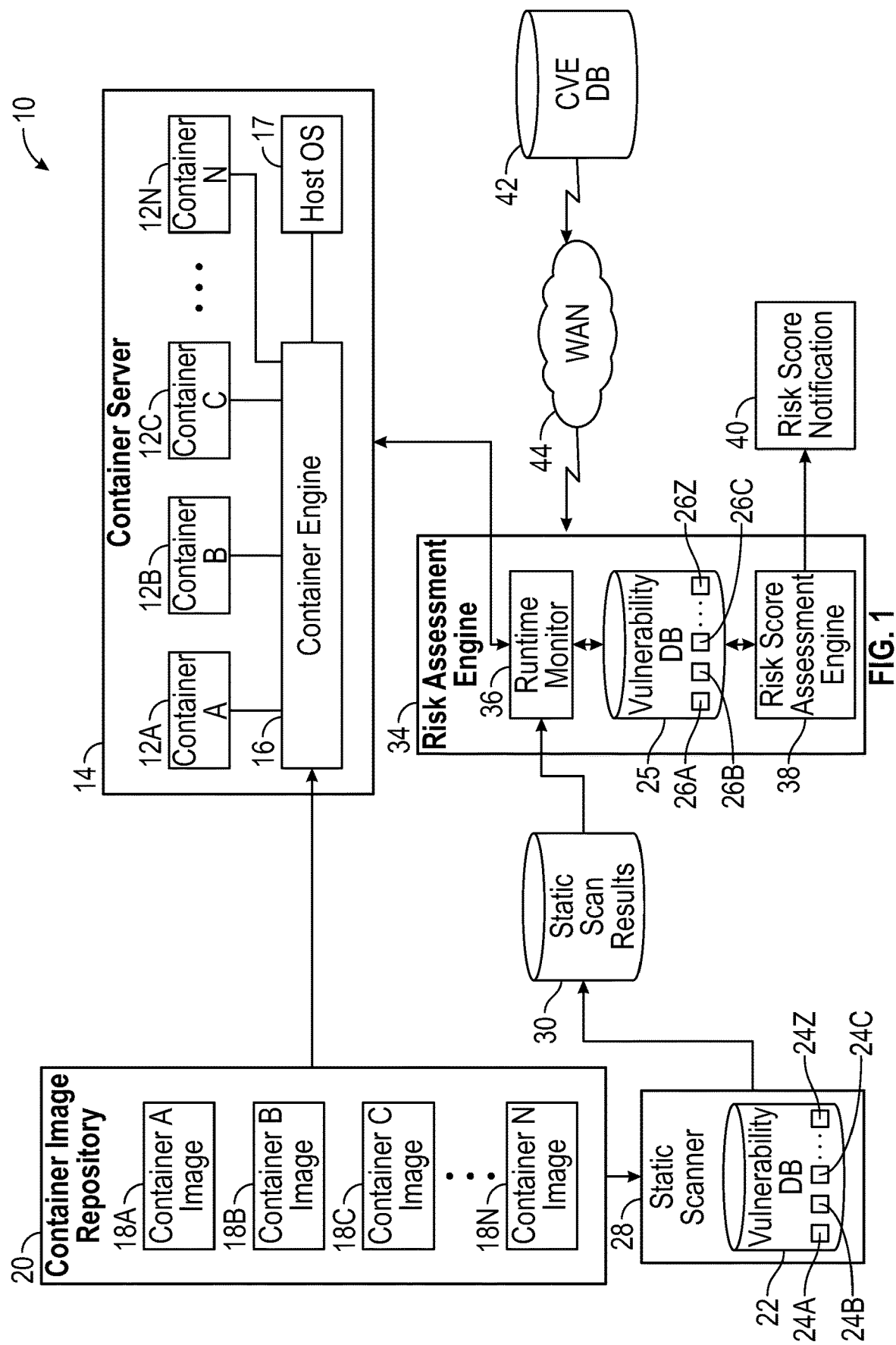
FIG. 1 schematically illustrates an example system for assessing software containers for vulnerabilities.

FIG. 1 schematically illustrates an example system 10 for assessing software containers 12A-N for vulnerabilities. The software containers 12 run on a container server 14. A container engine 16 of the container server 14 instantiates the software containers 12A-N from respective corresponding software container images 18A-N in a software container image repository 20. Thus, software container 12A is instantiated from software container image 18A, software container 12B is instantiated from software container image 18B, software container 12C is instantiated from software container image 18C, and software container 12N is instantiated from software container image 18N.

The container engine 16 runs the software containers 12 on top of a host operating system 17, which is a Linux operating system in one or more embodiments. The container engine 16 may be Docker or Kubernetes for example.

As used herein, the letter N in a reference numerals 12N and 18N indicates a plurality of the component corresponding to that numeral. Although N is the fourteenth letter of the alphabet, the use of "N" does not necessarily connote that there are fourteen software container images 18 and corresponding software containers 12. The example of FIG. 1 depicts a non-limiting example in which there is one-to-one relationship between the quantity of software container images 18 and software containers 12 instantiated from the software container images 18. However, it is understood other configurations would be possible, such as not all of the software containers 12 being be instantiated at one time and/or multiple software containers 12 being instantiated from a single container image 18. Any quantity of software containers images 18 and corresponding software containers 12 could be used that is greater than or less than the quantity shown in FIG. 1.

The system 10 includes a first software vulnerability database 22, which includes static scan rulesets 24A-N, and a second software vulnerability database 25, which includes runtime monitoring rulesets 26A-N. Each static scan ruleset 24 corresponds to one of the runtime monitoring rulesets 26, and together they form a combined ruleset that corresponds to a particular software vulnerability.

Each static scan ruleset 24 includes one or more first criteria that can be detected during a static scan of the software container image 18 or its intended execution environment (e.g., of the container engine 16 and/or host operating system 17). Each runtime monitoring ruleset 26 includes one or more second criteria that relate to runtime behavior of a software container 12. For a given combined ruleset for a given software vulnerability, the one or more second criteria differ from the one or more first criteria.

In one example, the second software vulnerability database 25 is encrypted, which may help avoid tampering with the rulesets 26A-Z by malicious actors. As used herein, the letter Z in reference numerals 24Z and 26Z indicates a plurality of the vulnerability rulesets. Although Z is the twenty-sixth letter of the alphabet, the use of "Z" does not necessarily connote that there are twenty-six vulnerability rulesets 24 and 26. Any quantity of software vulnerabilities could be described in the rulesets 24A-Z and 26A-Z of the vulnerability databases 22, 25.

A static scanner 28 is configured to perform static scanning using the static scan rulesets 24 of the first software vulnerability database 22 to determine whether the software container images 18 or their intended execution environment meet the one or more first criteria for any of the software vulnerabilities. The static scanner 28 may use filenames, hash checks, and/or signature checks to identify files, for example, and/or may analyze a manifest of the various software container images 18 to assess the software container images (e.g., for filenames, container engine 16 information, host operating system 17 information, etc.).

In one example, the static scanner 28 only scans the container images 18 and is able to determine the container engine 16 and host operating system from the static scan of the container image 18 (e.g., from a manifest of the software container image 18). In one example, the static scanner 28 communicates with the container server 14 to determine details about the container engine 16 and/or the host operating system 17.

The static scanner 28 stores static scan results 30 from its scanning in a static scan results database 30. In one example, the static scanner 28 is a known scanning tool such as Clair (from CoreOSTM/Red Hat®), Trivy (from Aqua® Security Software, Ltd.), or Anchore (from Anchore, Inc.). Of course, it is understood that these are non-limiting examples, and other static scanners could be used.

The system includes a risk assessment engine 34 that includes a runtime monitor 36 and a risk score assessment engine 38. In one example the risk assessment engine 34 is a microservice.

The runtime monitor 36 is configured to monitor runtime behavior of the software containers 12 to determine if any of the software containers meet the one or more second criteria for any of the software vulnerabilities. The runtime monitor 36 may look for things such as network access, specific port access, Linux capabilities, configured security for web applications, etc., for example.

In one example, the runtime monitor 36 only looks to see if the one or more second criteria for a particular vulnerability is met if the static scan results database 30 indicates that the one or more first criteria for the software vulnerability are met.

If the one or more first criteria and one or more second criteria for a particular software vulnerability are met by a software container 12 and its corresponding container image 18, the risk score assessment engine 38 determines a score that indicates a magnitude of a risk the software vulnerability poses for the software container 12, and provides a risk score notification 40 based on the risk score. The risk score notification 40 may be provided to a system administrator, for example. The risk score notification 40 may include the risk score or a notification that the risk score is available. The risk score notification may be provided in a report in JavaScript Object Novation (JSON), Hypertext Markup Language (HTML), TXT format, or some other format, for example.

The risk assessment engine 34 is configured to periodically update the second vulnerability database 25 from a separate vulnerability database 42 (e.g., on a daily basis). In the example of FIG. 1, the vulnerability database 42 is a Common Vulnerabilities and Exposures (CVE) database such as the one available at https://cve.mitre.org/. The risk assessment engine 34 communicates with the vulnerability database 42 over a wide area network 44, such as the Internet.

In one example, the risk assessment engine 34 automatically updates the second vulnerability database 25 by parsing vulnerability descriptions from the CVE database and/or reviewing attack vectors indicated by the vulnerability database 42.

In one example, the static scanner 28 and/or the risk assessment engine 34 are operable to update the first software vulnerability database 22 based on the vulnerability database 42 (e.g., a CVE database).

Figure 2:
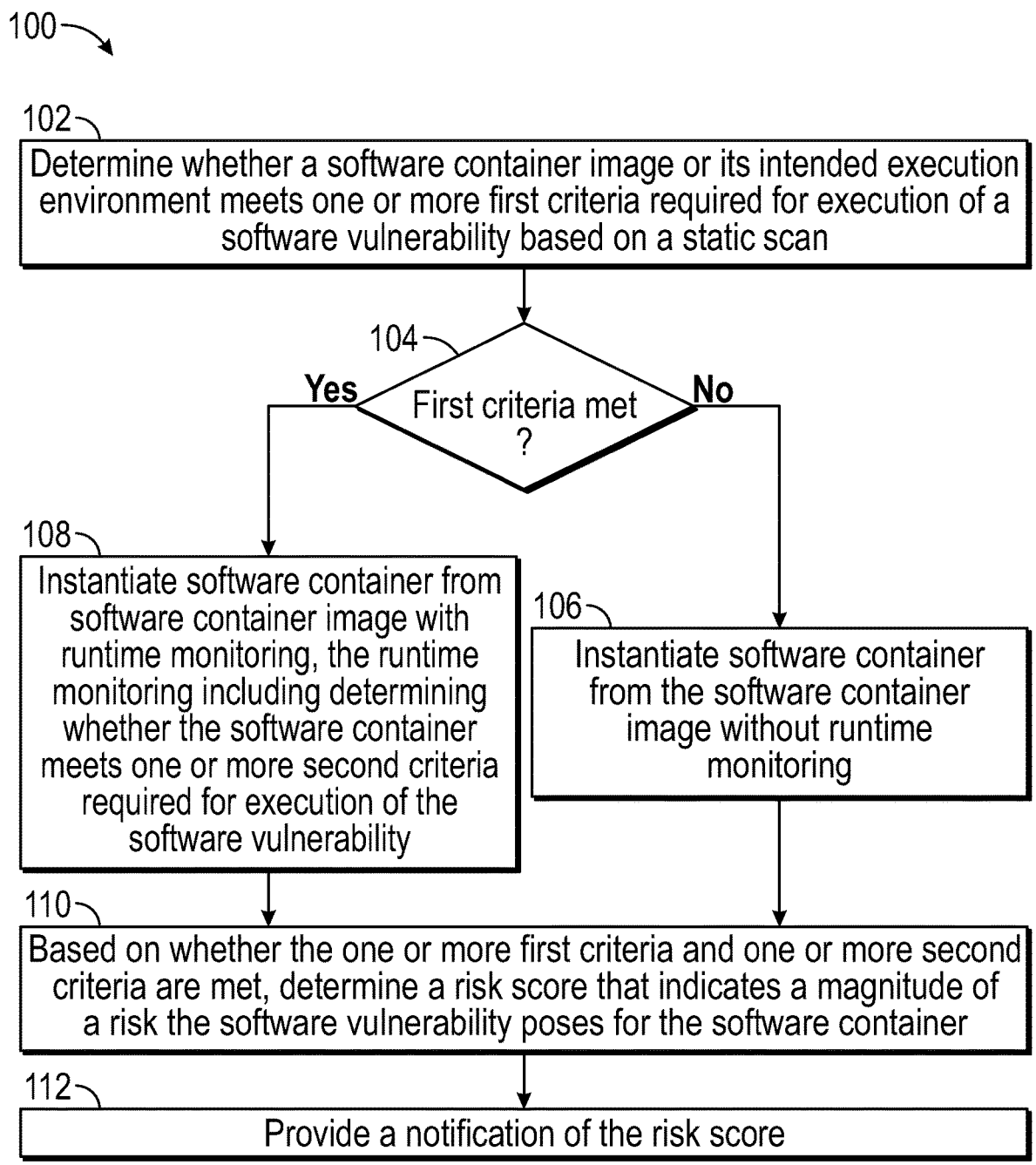
FIG. 2 is a flowchart of an example method for assessing software containers for vulnerabilities.

FIG. 2 is a flowchart 100 of an example method for assessing software containers 12 for vulnerabilities. A determination is made of whether a software container image 18 or its intended execution environment (such as the container engine 16 or host operating system 17) meets one or more first criteria required for execution of a software vulnerability based on a static scan of the software container image 18 by static scanner 28 (step 102).

If the one or more first criteria are not met (a "no" to 104), the container engine 16 instantiates a software container 12 from the software container image 18 without runtime monitoring (step 106).

Conversely, if the one or more first criteria are met (a "yes" to 104), the container engine 16 instantiates the software container 12 from the software container image 18 with runtime monitoring (step 108). The runtime monitoring includes determining whether the software container 12 meets the one or more second criteria required for execution of the software vulnerability.

Based on whether the one or more first criteria and one or more second criteria are met, a risk score is determined that indicates a magnitude of a risk the software vulnerability poses for the software container (step 110). A notification of the risk score is provided based on step 110 (step 112).

In one or more embodiments, the risk assessment engine 34 omits the runtime monitoring, the determination of a risk score, and the notification of a risk for a particular software container 12 based on a static scan of the software container image 18 corresponding to the particular software container 12 not detecting any vulnerabilities.

For example, if a vulnerability is exploitable only if a specific port is open, and the static scanner 28 does not determine that the port is open for a particular software container image 18, then the risk assessment engine 34 verifies that the port is still not open at runtime, and if the port is still not open then the risk assessment engine 34 may omit further runtime monitoring for that particular vulnerability for the software container 12 instantiated from the particular software container image 18. In other examples, where no verification is needed, the risk assessment engine 34 may omit all runtime monitoring for a particular vulnerability for software container 12 if none of the first criteria are met for that vulnerability.

In one or more embodiments, the risk score is one of a plurality of risk scores that includes a first score of "low" that indicates a low risk, a second score of "intermediate" that indicates an intermediate risk, and a third score of "high" that indicates a high risk. Of course, it is understood that these are just examples and that other scores and other quantities of scores could be included (e.g., a score of "negligent" which is a lower risk than "low" and a score of "critical" which is a higher risk than "high").

In one or more embodiments, the risk score assessment engine 38 determines a first risk score based on the software container 12 meeting the one or more second criteria, and determines a second risk score based on the software container 12 not meeting the one or more second criteria, where the first risk score indicates a greater magnitude of risk than the second score.

Many vulnerabilities have a Common Vulnerability Scoring System (CVSS) score that is assigned outside of the system 10. In one or more embodiments, the "first risk score" in the preceding paragraph is the CVSS score or is based on the CVSS score, and the "second risk score" in the preceding paragraph is an adjusted version of the CVSS score.

Thus, even if a vulnerability has a CVSS score of "high" or "critical," if the runtime monitor 36 determines that the one or more second criteria for exploiting the vulnerability are not met, then a lower risk score may be assigned for that vulnerability.

Some example vulnerabilities will now be described in connection with the flowchart 100 of FIG. 2.

CVE-2019-10160

In one or more embodiments, the one or more first criteria for a vulnerability includes a requirement that a particular software package is part of the software container image, and the one or more second criteria for the vulnerability includes a requirement that the particular software package is executed during runtime of the software container. One such vulnerability is CVE-2019-10160.

The CVE-2019-10160 vulnerability, which is described in more detail at https://nvd.nist.gov/vuln/detail/CVE-2019-10160, has a CVSS score of 9.8 which denotes "critical." Under the CVE-2019-10160 vulnerability, when an application parses user-supplied URLs to store cookies, authentication credentials, or other kind of information, it is possible for an attacker to provide specially crafted URLs to make the application locate host-related information (e.g., cookies, authentication data) and send them to a different host than where it should, unlike if the URLs had been correctly parsed.

This vulnerability only affects Python versions 2.7, 3.5, 3.6, 3.7, and versions v3.8.0a4 through v3.8.0b1. Thus, in one example, the one or more first criteria for this vulnerability includes a requirement that one of these affected versions of Python is present in a particular software container image 18. In this same example, the one or more second criteria for this vulnerability includes a requirement that the version of Python is executed at runtime by a particular software container 12 instantiated from the particular software container image 18. Of course, additional criteria for this vulnerability could be used if desired.

The runtime monitor 36 monitors runtime behavior of the particular software container 12 to determine if Python is executed. In one example, this includes checking "file open" operations on a location where Python is installed (e.g., "/usr/bin/python") and/or reviewing a "syscalls" history to determine if Python was ever opened.

As discussed above, in one or more embodiments, the risk score assessment engine 38 determines a first risk score based on the software container meeting the one or more second criteria, and determines a second risk score based on the software container not meeting the one or more second criteria, where the first risk score indicates a greater magnitude of risk than the second score.

In one example for CVE-2019-10160, the risk score assessment engine 38 determines the "first risk score" as being "high" based on the software container meeting the second criterion (i.e., the affected version of Python is used at runtime), and determines the "second risk score" of "low" based on the software container 12 not meeting the second criterion (i.e., the affected version of Python is not used at runtime).

In one example, the score of "high" is based on the CVSS score of 9.8, and the score of "low" is an adjusted version of the CVSS score which reflects that the magnitude of risk of the vulnerability is lower than 9.8 because an affected version of Python is not used at runtime.

CVE-2018-1111

In one or more embodiments, the one or more first criteria for a vulnerability includes a requirement that the intended execution environment for a particular software container image 18 includes in one or more particular versions of Linux, and the one or more second criteria includes a requirement that a particular Linux capability is enabled during runtime of the software container 12 instantiated from the software container image 18. One such vulnerability is CVE-2018-1111.

The CVE-2018-1111 vulnerability, which is described in more detail at https://nvd.nist.gov/vuln/detail/CVE-2018-1111, has a CVSS score of 7.5 which denotes "high." Under the CVE-2018-1111 vulnerability, Dynamic Host Configuration Protocol (DHCP) packages in Red Hat Enterprise Linux 6 and 7, Fedora 28, and earlier are vulnerable to a command injection flaw in the Linux NetworkManager integration script included in the DHCP client. A malicious DHCP server, or an attacker on the local network able to spoof DHCP responses, could use this flaw to execute arbitrary commands with root privileges on systems using NetworkManager and configured to obtain network configuration using the DHCP protocol.

Thus, in one example, the one or more first criteria for this vulnerability includes a requirement that one of the affected versions of Linux is used, and the one or more second criteria for this vulnerability includes a requirement that DHCP is enabled. Of course, additional criteria for this vulnerability could be used if desired.

In one example, if the first and second criteria are fulfilled, the risk score assessment engine 38 assigns a score of "high" and if only the first criteria are met, a score of "low" or "negligible" is assigned.

CVE-2019-7303

In one or more embodiments, the one or more first criteria for a vulnerability includes a requirement that the software container image 18 includes one or more particular versions of a Linux software package, and the one or more second criteria includes a requirement that a particular Linux security facility is enabled during runtime of the software container 12 instantiated from the software container image 18. One such vulnerability is CVE-2019-7303.

The CVE-2019-7303 vulnerability, which is described in more detail at https://nvd.nist.gov/vuln/detail/CVE-2019-7303, has a CVSS score of 7.5 which denotes "high." This vulnerability affects the "seccomp" filters of Canonical snapd before version 2.37.4 and allows a strict mode snap to insert characters into a terminal on a 64-bit host. The seccomp rules were generated to match 64-bit ioctl(2) commands on a 64-bit platform; however, the Linux kernel only uses the lower 32 bits to determine which ioctl(2) commands to run. This vulnerability affects Canonical snapd versions prior to 2.37.4.

Thus, in one example, the one or more first criteria for this vulnerability includes a requirement that version 2.37.4 or earlier of the Linux software package Canonical snapd is present, and the one or more second criteria includes a requirement that the Linux security facility seccomp is enabled.

In one example, if seccomp is disabled, then at least one of the second criteria is not met, and a risk score of "low" or "negligible" is assigned." If the first criteria and second criterion are met, then a risk score of "high" is assigned."

CVE-2019-2054

In one or more embodiments, the one or more first criteria for a vulnerability includes a requirement that the intended execution environment of the software container image 18 includes one or more particular versions of Linux, and the one or more second criteria includes a requirement that a particular Linux security facility is enabled during runtime of the software container 12 instantiated from the software container image 18. One such vulnerability is CVE-2019-2054.

The CVE-2019-2054 vulnerability, which is discussed in more detail at https://nvd.nist.gov/vuln/detail/CVE-2019-2054, has a CVSS score of 7.8 which denotes "high." This vulnerability is in the seccomp implementation in the Linux kernel prior to version 4.8. According to this vulnerability, there is a possible seccomp bypass due to seccomp policies that allow the use of the Linux system call ptrace. This could lead to local escalation of privilege with no additional execution privileges needed.

Thus, in one example, the one or more first criteria for this vulnerability includes a requirement that version 4.8 or earlier of the Linux kernel is installed, and the one or more second criteria for this vulnerability includes a requirement that seccomp is enabled and that ptrace is enabled in one or more system calls of seccomp.

In one example, if seccomp is disabled, then a risk score of "low" or "negligible" is assigned, if seccomp is enabled and ptrace is not enabled a risk score of "medium" is assigned, and if seccomp is enabled and ptrace is enabled in one or more system calls of seccomp a risk score of "high" is assigned."

CVE-2019-3901

In one or more embodiments, the one or more first criteria for a vulnerability includes a requirement that the intended execution environment for the software container image 18 includes one or more particular versions of Linux, and the one or more second criteria includes a requirement that a particular Linux rights flag is enabled during runtime of the software container 12 instantiated from the software container image 18. One such vulnerability is CVE-2019-3901.

The CVE-2019-3901 vulnerability, which is discussed in more detail at https://nvd.nist.gov/vuln/detail/CVE-2019-3901, has a CVSS score of 4.7 which denotes "medium." In this vulnerability, a race condition in perf_event_open( ) allows local attackers to leak sensitive data from setuid programs. As no relevant locks (in particular the cred_guard_mutex) are held during the ptrace_may_access( ) call, it is possible for the specified target task to perform an execve( ) syscall with setuid execution before perf_event_alloc( ) actually attaches to it, allowing an attacker to bypass the ptrace_may_access( ) check and the perf_event_exit_task(current) call that is performed in install_exec_creds( ) during privileged execve( ) calls. This issue affects Linux kernel versions before 4.8.

Thus, in one example, the one or more first criteria for this vulnerability includes a requirement that the host operating system 17 uses version 4.8 or earlier of the Linux kernel, and the one or more second criteria for this vulnerability includes a requirement that the setuid and setgid Linux right flags are used.

In one example, if setuid and/or setgid are used, then a risk score of "medium" is assigned, and if setuid and/or setgid are not used, then a risk score of "low" is assigned.

CVE-2019-5420

In one or more embodiments, the one or more first criteria for a vulnerability includes a requirement that the software container image 18 is configured to access a URL associated with exploitation of the software vulnerability, and the one or more second criteria includes a requirement that the software container 12 does not require a username and password to be provided in response to a request to access the URL. One such vulnerability is CVE-2019-5420.

The CVE-2019-5420 vulnerability, which is discussed in more detail at https://nvd.nist.gov/vuln/detail/CVE-2019-

5420, has a CVSS score of 9.8 which denotes "critical." This is a remote code execution vulnerability in development mode of Ruby on Rails version 5.2.2.1 or earlier or 6.0.0.beta3 or earlier which can allow an attacker to guess the automatically generated development mode secret token. This secret token can be used in combination with other Rails internals to escalate to a remote code execution exploit. Executing this vulnerability requires access to a first URL to obtain vulnerability files (https://github.com/knqyf263/CVE-2019-5420), and to a second URL to execute the vulnerability (http://127.0.0.1:3000/rails/active_storage/disk/eyJXXXX38fd3d/test where "XXXX" is a shortened version of the URL).

Thus, in one example, the one or more first criteria for this vulnerability includes a requirement that one of the affected versions of Ruby on Rails is used and that the first URL appears in the container image, and the one or more second criteria for this vulnerability includes a requirement that the second URL is accessed at runtime.

In one example, if the first and second criteria are met and no username/password is required in response to a request to load the second URL, then a risk of "high" is assigned. However, if the first and second criteria are met but a username/password are required in response to a request to load the second URL, then a risk score of "low" is provided.

CVE-2018-1111

In one or more embodiments, the one or more first criteria for a vulnerability includes a requirement that the software container image is configured to access a URL associated with exploitation of the software vulnerability, the one or more second criteria includes a requirement that Dynamic Host Configuration Protocol (DHCP) is enabled in the software container. One such vulnerability is CVE-2018-1111.

The CVE-2018-1111 vulnerability, which is discussed in more detail at https://nvd.nist.gov/vuln/detail/CVE-2018-1111, has a CVSS score of 7.5 which denotes "high." This vulnerability affects DHCP packages in Red Hat Enterprise Linux 6 and 7 and Fedora 28 and earlier, which are vulnerable to a command injection flaw in the NetworkManager integration script included in the DHCP client. A malicious DHCP server, or an attacker on the local network able to spoof DHCP responses, could use this flaw to execute arbitrary commands with root privileges on systems using NetworkManager and configured to obtain network configuration using the DHCP protocol.

Thus, in one example, the one or more first criteria for this vulnerability includes a requirement that the operating system 17 is one of the affected versions, and the one or more second criteria for this vulnerability includes a requirement that DHCP is enabled and a malicious DHCP server URL is used.

In one example, if the first and second criteria are met then a risk score of "high" is assigned. However, if the DHCP is disabled, then a risk score of "low" is assigned.

CVE-2019-13509

In one or more embodiments, the one or more first criteria for a vulnerability includes a requirement that the container engine 16 is a particular version of a particular container engine which includes a first mode and a second mode, and the second mode is an enhanced logging mode in which a greater amount of logging is performed than in the first mode (e.g., an "information" mode in Docker, see https://docs.docker.com/engine/reference/commandline/info/), and the one or more second criteria includes a requirement that the the container engine is configured to instantiate the software container in the first mode. One such vulnerability is CVE-2019-13509.

The CVE-2019-13509 vulnerability, which is discussed in more detail at https://nvd.nist.gov/vuln/detail/CVE-2019-13509, has a CVSS score of 7.5 which denotes "high." This vulnerability affects particular versions of the Docker container engine 16 (Docker CE and EE before 18.09.8 as well as Docker EE before 17.06.2-ee-23 and 18.x before 18.03.1-ee-10). In this vulnerability, the Docker Engine in debug mode may sometimes add secrets to the debug log. This applies to a scenario where a Docker stack deploy is run to redeploy a stack that includes (non external) secrets. It potentially applies to other API users of the stack API if they resend the secret.

Thus, in one example, the one or more first criteria for this vulnerability includes a requirement that an affected version of Docker is used for the container engine 16, and the one or more second criteria for this vulnerability includes a requirement that Docker is run in information mode.

In one example, if the one or more first criteria and one or more second criteria are met, then a risk score of "high" is assigned. However, if the one or more first criteria are met but Docker is not run in information mode and/or is not run in Debug mode, then a risk score of "low" is assigned."

CVE-2019-3818

In one or more embodiments, the one or more first criteria for a vulnerability includes a requirement that the container engine 16 is a particular version of a particular container engine, and the one or more second criteria includes a requirement Transport Layer Security (TLS) authentication is enabled in the software container 12. One such vulnerability is CVE-2019-3818.

The CVE-2019-3818 vulnerability, which is discussed in more detail at https://nvd.nist.gov/vuln/detail/CVE-2019-3818, has a CVSS score of 7.5 which denotes "high." This vulnerability affects the Kubernetes container engine when used in the Red Hat OpenShift Container Platform. According to this vulnerability, the kube-rbac-proxy container before version 0.4.1 as used in Red Hat OpenShift Container Platform does not honor TLS configurations, allowing for use of insecure ciphers and TLS 1.0. An attacker could target traffic sent over a TLS connection with a weak configuration and potentially break the encryption.

Thus, in one example, the one or more first criteria for this vulnerability includes a requirement that an affected version of Kubernetes is used as the container engine 16, and a requirement that the Red Hat OpenShift Container Platform is used. The one or more second criteria include a requirement that TLS is enabled.

In one example, the runtime monitor 36 compares a strength of a cipher that the software container 12 uses for TLS authentication to a cipher strength threshold. A risk score of "high" is determine if the cipher does not meet the cipher strength threshold, and a lower risk score of "low" is assigned if the cipher does meet the cipher strength threshold.

Although multiple vulnerabilities are been discussed above, it is understood that these vulnerabilities are non-limiting examples and that the system 10 could be configured to detect many other vulnerabilities, including or excluding the vulnerabilities discussed above.

Figure 3:
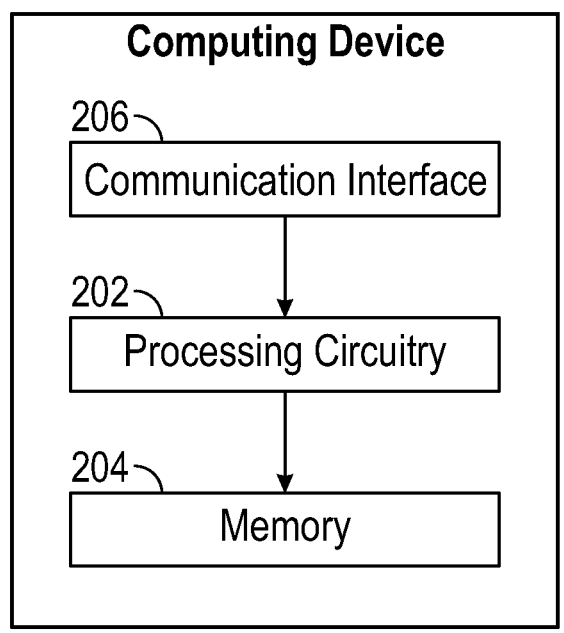
FIG. 3 schematically illustrates an example computing device that may be used in the system of FIG. 1.

FIG. 3 schematically illustrates an example computing device 200. The computing device 200 architecture may be used to implement the static scanner 28 and risk assessment engine 34 on a single computing device or on multiple computing devices. The computing device 200 includes processing circuitry 202 operatively connected to memory 204 and a communication interface 206. The processing circuitry 202 may include one or more microprocessors, microcontrollers, application specific integrated circuits (ASICs), or the like, for example.

The memory 204 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media. The memory 204 can also have a distributed architecture, where various components are situated remotely from one another, but can be accessed by the processing circuitry 202.

The communication interface 206 is configured to facilitate communication between the computing device 200 and other computing devices (e.g., over a computer network).

The system 10 for assessing software containers for vulnerabilities includes memory 204 and processing circuitry 202 which may be implemented on a single computing device 200 or multiple computing devices 200. The processing circuitry 202 is configured to determine, based on a static scan, that a software container image 18 or an intended execution environment for the software container image 18 meets one or more first criteria required to exploit a software vulnerability. The processing circuitry 202 is configured to, based on the determination, monitor runtime behavior of a software container instantiated from the software container image, the monitoring including a determination of whether the software container meets one or more second criteria required to exploit the software vulnerability, where the one or more first criteria differs from the one or more second criteria. The processing circuitry 202 is configured to, based on the runtime monitoring, determine a risk score that indicates a magnitude of a risk the vulnerability poses for the software container, and provide a notification of the risk score.

The system 10 provides a more accurate representation of the risk posed by the vulnerability than a third party score, such as a CVSS score, because the risk score determined by the risk score assessment engine 38 takes into account runtime behavior of a software container 12 and how difficult it would be to exploit a vulnerability. This may be helpful to system administrators who have to determine the actual risks associated with their containers and a relative urgency of addressing those risks.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method, comprising:
    determining, based on a static scan, that a software container image or an intended execution environment for the software container image meets one or more first criteria required to exploit a software vulnerability;
    based on the determining, monitoring runtime behavior of a software container instantiated from the software container image, the monitoring including determining whether the software container meets one or more second criteria required to exploit the software vulnerability, wherein the one or more first criteria differs from the one or more second criteria;
    based on the runtime monitoring, determining a risk score that indicates a magnitude of a risk the software vulnerability poses for the software container; and
    providing a notification of the risk score;
    wherein said determining the risk score comprises determining a first risk score based on the software container meeting the one or more second criteria, and determining a second risk score based on the software container not meeting the one or more second criteria, wherein the first risk score indicates a greater magnitude of the risk than the second risk score.

2. The method of claim 1, wherein:
    the first risk score is a Common Vulnerability Scoring System (CVSS) score for the software vulnerability or is based on the CVSS score; and
    the second risk score is an adjusted version of the CVSS score that indicates a lower magnitude of risk than the CVSS score.

3. The method of claim 1, wherein:
    the one or more first criteria includes a requirement that a particular software package is part of the software container image; and
    the one or more second criteria includes a requirement that the particular software package is executed during runtime of the software container.

4. The method of claim 1, wherein:
    the one or more first criteria includes a requirement that the software container image includes one or more particular versions of a Linux software package or that the intended execution environment for the software container image includes one or more particular versions of Linux; and
    the one or more second criteria includes a requirement that a particular Linux capability, Linux security facility, or Linux rights flag is enabled during runtime of the software container.

5. The method of claim 1, comprising:
    omitting the monitoring, determining, and providing steps for an additional software container that is instantiated from an additional software container image, wherein the omitting is performed based on the static scan detecting no vulnerabilities in the additional software container image or the intended execution environment of the additional software container image.

6. A method, comprising:
    determining, based on a static scan, that a software container image or an intended execution environment for the software container image meets one or more first criteria required to exploit a software vulnerability;
    based on the determining, monitoring runtime behavior of a software container instantiated from the software container image, the monitoring including determining whether the software container meets one or more second criteria required to exploit the software vulnerability, wherein the one or more first criteria differs from the one or more second criteria;
    based on the runtime monitoring, determining a risk score that indicates a magnitude of a risk the software vulnerability poses for the software container; and
    providing a notification of the risk score;
    wherein the one or more first criteria includes a requirement that the software container image is configured to access a URL associated with exploitation of the software vulnerability; and wherein the one or more second criteria includes one of the following:
  a requirement that the software container does not require a username and password to be provided in response to a request to access the URL; and
  a requirement that Dynamic Host Configuration Protocol (DHCP) is enabled in the software container.

7. The method of claim 1, wherein:
the one or more first criteria includes a requirement that a container engine configured to instantiate the software container is a particular version of a particular container engine which includes a first mode and a second mode, and the second mode is an enhanced logging mode in which a greater amount of logging is performed than in the first mode; and
the one or more second criteria includes a requirement that the that the container engine instantiates the software container in the first mode.

8. A method, comprising:
determining, based on a static scan, that a software container image or an intended execution environment for the software container image meets one or more first criteria required to exploit a software vulnerability;
based on the determining, monitoring runtime behavior of a software container instantiated from the software container image, the monitoring including determining whether the software container meets one or more second criteria required to exploit the software vulnerability, wherein the one or more first criteria differs from the one or more second criteria;
based on the runtime monitoring, determining a risk score that indicates a magnitude of a risk the software vulnerability poses for the software container; and
providing a notification of the risk score;
wherein the one or more first criteria includes a requirement that a container engine configured to instantiate the software container is a particular version of a particular container engine; and
wherein the one or more second criteria includes a requirement that Transport Layer Security (TLS) authentication is enabled in the software container.

9. The method of claim 8, wherein the software container is configured to use a cipher for TLS authentication, and wherein said determining the risk score comprises:
determining the first risk score based on a strength of the cipher not exceeding a cipher strength threshold; and
determining the second risk score based on the strength of the cipher exceeding the cipher strength threshold.

10. A system for assessing software containers for vulnerabilities, comprising:
memory; and
processing circuitry operatively connected to memory and configured to:
  determine, based on a static scan, that a software container image or an intended execution environment for the software container image meets one or more first criteria required to exploit a software vulnerability;
  based on the determination, monitor runtime behavior of a software container instantiated from the software container image, the monitoring including a determination of whether the software container meets one or more second criteria required to exploit the software vulnerability, wherein the one or more first criteria differs from the one or more second criteria;
  based on the runtime monitoring, determine a risk score that indicates a magnitude of a risk the vulnerability poses for the software container; and
  provide a notification of the risk score;
wherein to determine the risk score, the processing circuitry is configured to determine a first risk score based on the software container meeting the one or more second criteria, and determine a second risk score based on the software container not meeting the one or more second criteria, wherein the first risk score indicates a greater magnitude of the risk than the second risk score.

11. The system of claim 10, wherein:
the first risk score is a Common Vulnerability Scoring System (CVSS) score for the software vulnerability or is based on the CVSS score; and
the second risk score is an adjusted version of the CVSS score that indicates a lower magnitude of risk than the CVSS score.

12. The system of claim 10, wherein:
the one or more first criteria includes a requirement that a particular software package is part of the software container image; and
the one or more second criteria includes a requirement that the particular software package is executed during runtime of the software container.

13. The system of claim 10, wherein:
the one or more first criteria includes a requirement that the software container image includes one or more particular versions of a Linux software package or that the intended execution environment for the software container image includes one or more particular versions of Linux; and
the one or more second criteria includes a requirement that a particular Linux capability, Linux security facility, or Linux rights flag is enabled during runtime of the software container.

14. The computing device of claim 10, wherein the processing circuitry is configured to:
omit the monitoring of runtime behavior for an additional software container that is instantiated from an additional software container image, wherein the omission is based on the static scan detecting no vulnerabilities in the additional software container image or the intended execution environment of the additional software container image.

15. A system for assessing software containers for vulnerabilities, comprising:
memory; and
processing circuitry operatively connected to memory and configured to:
  determine, based on a static scan, that a software container image or an intended execution environment for the software container image meets one or more first criteria required to exploit a software vulnerability;
  based on the determination, monitor runtime behavior of a software container instantiated from the software container image, the monitoring including a determination of whether the software container meets one or more second criteria required to exploit the software vulnerability, wherein the one or more first criteria differs from the one or more second criteria;
  based on the runtime monitoring, determine a risk score that indicates a magnitude of a risk the vulnerability poses for the software container; and provide a notification of the risk score;
wherein the one or more first criteria includes a requirement that the software container image is configured to access a URL associated with exploitation of the software vulnerability; and
wherein the one or more second criteria includes one of the following:
   a requirement that the software container does not require a username and password to be provided in response to a request to access the URL; and
   a requirement that Dynamic Host Configuration Protocol (DHCP) is enabled in the software container.

16. The system of claim 10, wherein:
the one or more first criteria includes a requirement that a container engine configured to instantiate the software container is a particular version of a particular container engine which includes a first mode and a second mode, and the second mode is an enhanced logging mode in which a greater amount of logging is performed than in the first mode; and
the one or more second criteria includes a requirement that the that the container engine instantiates the software container in the first mode.

17. A system for assessing software containers for vulnerabilities, comprising:
memory; and
processing circuitry operatively connected to memory and configured to:
   determine, based on a static scan, that a software container image or an intended execution environment for the software container image meets one or more first criteria required to exploit a software vulnerability;
   based on the determination, monitor runtime behavior of a software container instantiated from the software container image, the monitoring including a determination of whether the software container meets one or more second criteria required to exploit the software vulnerability, wherein the one or more first criteria differs from the one or more second criteria;
   based on the runtime monitoring, determine a risk score that indicates a magnitude of a risk the vulnerability poses for the software container; and
   provide a notification of the risk score;
wherein the one or more first criteria includes a requirement that a container engine configured to instantiate the software container is a particular version of a particular container engine; and
wherein the one or more second criteria includes a requirement that Transport Layer Security (TLS) authentication is enabled in the software container.

18. The computing device of claim 17, wherein:
the software container is configured to use a cipher for TLS authentication; and
to determine the risk score, the processing circuitry is configured to:
   determine the risk score based on a strength of the cipher not exceeding a cipher strength threshold; and
   determine the second risk score based on the strength of the cipher exceeding the cipher strength threshold.

* * * * *